June 13, 1939.  J. TOBIN  2,162,683
MOTOR VEHICLE MUFFLER
Filed March 15, 1938
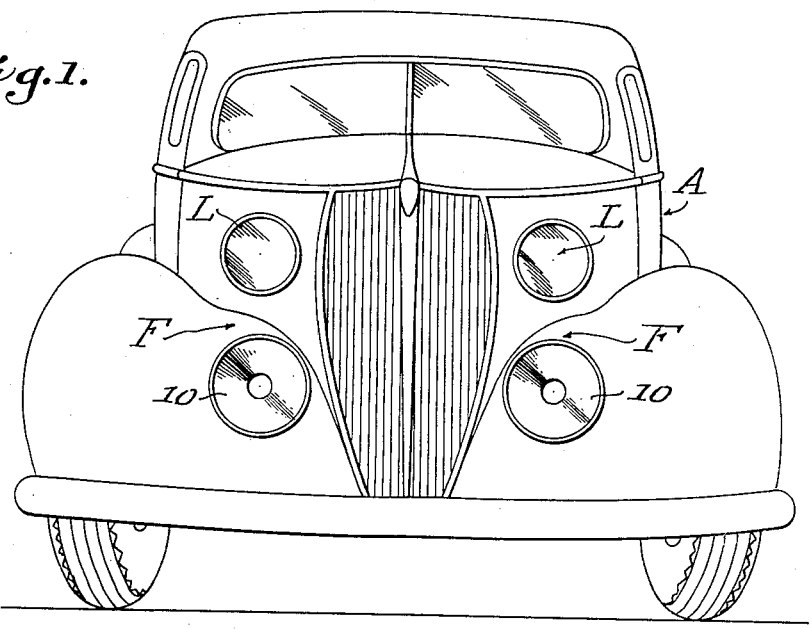
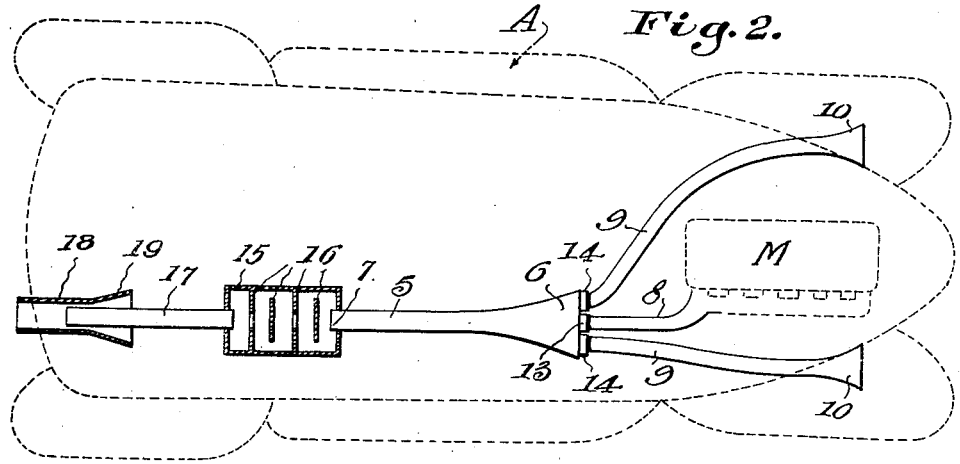
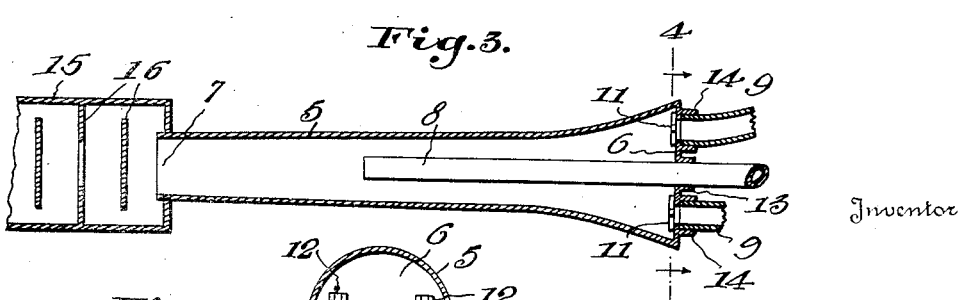
Inventor
James Tobin Patented June 13, 1939

2,162,683

UNITED STATES PATENT OFFICE 2,162,683

MOTOR VEHICLE MUFFLER

James Tobin, Youngstown, Ohio, assignor to Katherine Tobin, Youngstown, Ohio

Application March 15, 1938, Serial No. 196,062

4 Claims. (Cl. 181—51)

The invention aims to provide a new and improved muffler for automobiles and aircraft, so constructed as to prevent the exhaust gases from exerting back pressure upon the motor, and to silence the noise usually made by the exhaust.

With the foregoing in view, the invention resides in the novel subject matter hereinafter described and claimed, description being accomplished by reference to the accompanying drawing.

Fig. 1 is a front perspective view of an automobile equipped with the invention.

Fig. 2 is a top plan view partly in horizontal section, the outline of the automobile being shown in dotted lines.

Fig. 3 is a fragmentary horizontal sectional view through the muffler, a portion of the exhaust pipe being shown in elevation.

Fig. 4 is a detail sectional view on line 4—4 of Fig. 3.

The invention has been shown in connection with an automobile A having the usual internal combustion motor M, headlights L and front fender aprons F but it is to be understood that it is useable equally well upon various kinds of aircraft.

A tube 5, preferably rearwardly tapered, extends longitudinally of the vehicle and is provided with a closed front end 6 and with an open rear end 7. The exhaust pipe 8 leading from the motor M enters the front portion of the tube 5 through the closed front end 6 thereof and extends rearwardly and centrally within said tube, to any desired extent. Two air-conducting pipes 9 are provided to discharge air into the front portion of the tube 5 and to rearwardly direct air blasts alongside the exhaust pipe 8, the front ends of said pipes 9 being provided with air inlet funnels 10 disposed at the front of the vehicle. In an automobile, these funnels are preferably disposed under the headlights L and they open at the fronts of the fender aprons F, at which locations, they are sufficiently far above the road to prevent clogging with snow, mud and the like thrown up by other vehicles.

After the machine is in motion, the rearward blasts of air supplied through the funnels 10 and pipes 9, produce an ejector action on the exhaust pipe 8, tending to draw the exhaust gases from the motor instead of having said gases pushed out against accumulated pressure, as customary. All back pressure upon the motor is thus prevented and at the same time, the exhaust is silenced. The elimination of back pressure permits the motor to operate with greater efficiency and the silencing of the exhaust is of obvious advantage, particularly in connection with aircraft used for defensive or offensive purposes.

In order to prevent forward escape of exhaust gases when the motor is idling with the vehicle standing still, forwardly closable check valves 11 are provided for the air-conducting pipes 9. While the motor is idling with the vehicle standing still, sufficient pressure will exist in the tube 5 to hold the valves 11 closed, preventing any forward discharge of exhaust gases, but as soon as the vehicle attains any appreciable forward speed, the air pressure in the pipes 9 opens the valves 11 and the rearward blasts of air enter the tube 5 to evacuate the exhaust gases from the exhaust pipe 8.

The valves 11 may be of any desired type and located at any appropriate position. For illustrative purposes, they are shown in the form of flat plates pivotally hung at 12 at the inner side of the front wall 6 of the tube 5, and closable against said front wall.

The pipes 8 and 9 may be connected with the front end of the tube 5 in any suitable way. For illustrative purposes, collars 13 and 14 are shown upon the wall 6 to engage said pipes, said collars and pipes being connected with each other in any suitable manner, for instance, by contracting the collars around the pipes with the aid of conventional muffler clamps (not shown).

It is preferable that the rear end 7 of the tube 5 discharge into a casing 15 containing suitable baffles 16 mounted in any preferred way. A discharge pipe 17 extends rearwardly from the casing 15 and extends into the open front end of a tail pipe 18, said tail pipe having an air inlet funnel or scoop 19 for directing a rearward blast of air through said tail pipe around the pipe 17 to create an ejector action on the rear end of said pipe 17, further assisting in drawing the exhaust gases out and eliminating back pressure.

From the foregoing taken in connection with the acompanying drawing, it will be seen that novel and advantageous provision has been made for carrying out the object of the invention, and while a preferred arrangement has been shown, it is to be understood that the present disclosure is illustrative rather than limiting. Obviously, the parts may be of any suitable dimensions, locations, materials, etc. Moreover, if it be advisable to bend or offset any of the pipe portions to accommodate the invention to the vehicle, this may be done.

I claim:—

1. In a muffler for the exhaust gases from a motor-driven vehicle, a tube extending longitudinally of the vehicle and having a closed front end and an open rear end, an exhaust pipe from the motor extending centrally into said tube through said closed front end thereof, said exhaust pipe extending rearwardly into said pipe and having an open rear end, and two air-conducting pipes connected with the front portion of said tube for rearwardly discharging blasts of air into said tube alongside said exhaust pipe, said air-conducting pipes having air inlet funnels at their front ends disposed at the front end of the vehicle.

2. In a muffler for the exhaust gases from a motor-driven vehicle, a tube extending longinally of the vehicle and having a closed front end and an open rear end, an exhaust pipe from the motor extending centrally into said tube through said closed front end thereof, said exhaust pipe extending rearwardly into said tube and having an open rear end, two air-conducting pipes connected with the front end of said tube for rearwardly discharging blasts of air into said tube alongside said exhaust pipe, said air-conducting pipes having air inlet funnels at their front ends disposed at the front end of the vehicle, and two forwardly closable check valves for said air-conducting pipes respectively.

3. In a muffler for the exhaust gases from an automobile motor, a tube extending longitudinally of an automobile and having a closed front end and an open rear end, an exhaust pipe from the motor extending centrally into said tube through said closed front end thereof, said exhaust pipe extending rearwardly into said tube and having an open rear end, and two air-conducting pipes connected with the front end of said tube for rearwardly discharging blasts of air into said tube alongside said exhaust pipe, said air-conducting pipes having air inlet funnels at their front ends, said funnels being open in front of the usual front fender aprons of the automobile.

4. In a muffler for the exhaust gases from a motor-driven vehicle, a tube extending longitudinally of the vehicle and having a forwardly flared front end and a closure therefor, an exhaust pipe from the motor extending centrally through said closure into said tube, said exhaust pipe extending rearwardly beyond said flared portion of said tube and having an open rear end, two air-conducting pipes in front of said tube at opposite sides of said exhaust pipe and opening through said closure to force air into said flared end of said tube for rearward passage around said exhaust pipe, said air-conducting pipes having air inlet funnels at their front ends disposed at the front end of the vehicle, and forwardly closable check valves for said air-conducting pipes.

JAMES TOBIN.